Sept. 24, 1968  R. J. CARLSON ETAL  3,402,870
EXPLOSIVE TUBE WELDING DEVICE
Filed Sept. 20, 1965
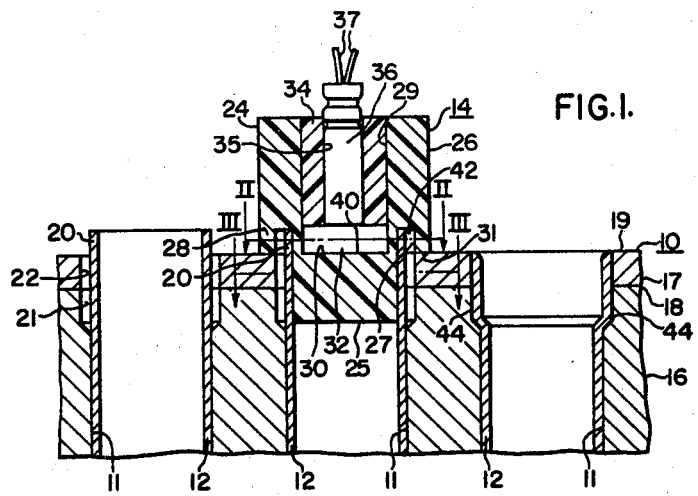
FIG.1.
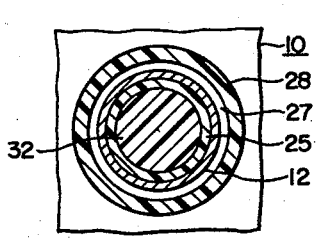
FIG.2.
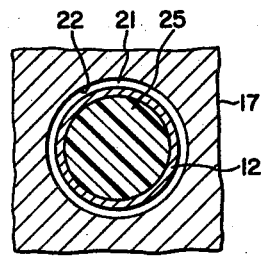
FIG.3.
WITNESSES
INVENTORS
Ronald L. Carlson
Charles C. Simons & Ronald L. Bradford
BY

United States Patent Office 3,402,870
Patented Sept. 24, 1968

3,402,870
EXPLOSIVE TUBE WELDING DEVICE
Ronald J. Carlson, Galloway, Ohio, Charles C. Simons, Kennewick, Wash., and Ronald L. Bradford, Columbus, Ohio, assignors, by mesne assignments, to Westinghouse Electric Corporation, Pittsburgh, Pa., a corporation of Pennsylvania
Filed Sept. 20, 1965, Ser. No. 488,670
6 Claims. (Cl. 228—3)

ABSTRACT OF THE DISCLOSURE

An expendable device for explosively welding an open-ended metal tube to the wall of a bore in a metal plate member, such as a heat exchanger tube sheet, comprises a plastic body member having a first cylindrical portion adapted to be inserted in the tube and a second cylindrical portion of larger cross-section having an annular skirt portion adapted to encompass the open end of the tube and having an end face adapted to abut the surface of the plate member. An explosive charge of discrete disc-shape is disposed in the plastic body in a plane parallel to the end face of the skirt. The body is further provided with an axial cavity for receiving a suitable detonating device.

The above device, in use, is effective to properly position the end of the tube a predetermined protrusion degree above the surface of the plate member and the explosive charge in predetermined juxtaposition with said surface, thereby to transmit the explosive energy of the explosive charge in a predetermined optimal manner to the tube to promote welding of the tube to the tube sheet.

The above device may be made in mass production and insures accurate placement of the explosive charge with respect to the tube and tube sheet in a repetitive manner by an unskilled operator. This aspect is especially important in the heat exchanger art where many tubes must be welded in an identical optimal and reliable manner to the tube sheet.

---

This invention relates to the autogenous bonding of metals by explosive means, usually termed explosion welding, and has for an object to provide an improved method of explosion welding a tube in a mating member.

In C. C. Simons and R. J. Carlson patent application No. 467,244, filed June 28, 1965, and assigned to the same assignee as the present invention, there is disclosed and claimed a method of welding tubes to a mating bore of a plate member by detonation of a high velocity explosive charge disposed concentrically with the tube. In accordance with that invention, the placement of the explosive charge in the tube is important, and preferably a disc-shaped charge of PETN, for example, is imbedded in a suitable plastic material and in a predetermined position with relation to the surface of the plate member in order to obtain an optimum explosively welded joint between the outer wall of the tube and the wall defining the bore. According to that invention, by placing the base of the disc-shaped charge in predetermined juxtaposition such as substantially flush with, slightly below or slightly above the surface of the plate member, and by positioning the tube so that its open end portion protrudes beyond the surface of the plate to a predetermined degree, the resulting weld joint extends from the surface of the plate to a sufficient depth to insure reliability under severe service conditions, and further, protruding tube portion is consistently sheared by the explosion to provide a substantially flush tube and plate structure.

In that invention, the explosive charge and the imbedding plastic are molded in situ. Accordingly, optimum welding is predicated on proper location of the tube (with the imbedded charge carried thereby) with relation to the plate surface. This manner of locating the charge, although suitable for low volume production, wherein the tube may be carefully positioned to properly position the explosive charge, is not desirable for volume or mass production, since the positioning step requires a degree of skill and attention on the part of the workman and the possibility of error could result in a faulty weld joint. Futher, this positioning step is time consuming and therefore costly.

Accordingly, it is a primary object of this invention to provide an expendable device having an explosive charge for explosively welding together a metal tube to a metal member disposed in encompassing relation therewith, which device facilitates positioning the explosive with relation to the surface of the member in a predetermined manner.

Another object is to provide an expendable device of the above type that is insertable in a tube and arranged to axially position an explosive charge with relation to the tube and the surface of the member in a predetermined manner.

A still further object is to provide an expendable device of the above type that may be readily manufactured in large quantity with a high degree of precise uniformity at relatively low cost.

Briefly, in accordance with the invention, there is provided a device for explosively welding a metal tube to the wall of a bore in a metal member such as a plate member. The device comprises a body member having a first portion of preferably solid cylindrical shape and a second portion coaxial with the cylindrical portion and of larger cross-sectional area than the latter. The second portion and the first portion jointly define an annular recess concentric with the cylindrical portion and the recess defines the inner periphery of an axially extending skirt portion. An explosive charge of discrete shape, for example wafer or disc-shape, is disposed in the body in a plane parallel to the annular end face of the skirt portion. The body is further provided with an axially extending cavity for receiving a suitable detonation initiating device.

In operation, after the tube has been inserted in a mating bore in the plate member and allowed to extend above the plane surface thereof to a reasonable degree, the explosive device is fitted to the end of the tube with its cylindrical portion in slidable telescopic relation therewith and pushed "home" or into full engagement therewith. The degree of engagement therewith is limited by abutment of the end face of the skirt portion with the surface of the plate member, at which time the proper position of the explosive charge with respect to the plate surface is attained. Also, the annular recess in the body serves to receive the extending end portion of the tube and to fix the protrusion of the tube above the plate surface to the desired degree.

After the detonation initiation device is inserted in the body cavity, the detonation device is fired to initiate the detonation of the explosive charge, with resulting explosive welding of the tube to the plate. The body of the explosive device is effective to transmit the explosive energy to the tube to promote the welding and is destroyed in the explosion.

The above and the objects are effected by the invention as will be apparent from the following description and claims taken in connection with the accompanying drawing, forming apart of this application, in which:

FIG. 1 is a sectional view of a portion of a tube and plate assembly, with an explosive device in accordance with the invention fitted to one of the tubes; and FIGS. 2 and 3 are transverse sectional views taken on lines II—II and III—III, respectively of FIG. 1.

Referring to the drawing in detail, in FIG. 1 there is shown a plate member 10 having a plurality of circular openings or bores 11 formed therein and disposed in mutually parallel spaced relation with each other. Each of the bores 11 has a circular tube 12 received therein, the tube 12 on the left being illustrated in the approximate axial position for welding to the inner wall of the associated bore 11, the tube 12 in the center being fitted with an expendable explosive device 14 formed in accordance with the invention and ready for the explosive welding operation, and the tube 12 on the right being shown after the explosion welding operation is completed.

All of the tubes 12 and bores 11 may be substantially identical and the plate member 10 may, if desired, be of clad construction having a major plate portion 16 of considerable thickness and formed of one metal such as a mild steel, and a relatively thin cladding plate portion 17 of a different metal, such as stainless steel or any other corrosive resistant metal, bonded to each other along a planar interface 18.

Clad plates of this type are well known in the art and are often employed in tube and shell heat exchangers where the outer planar surface 19 must resist attack of corrosive fluids in operation. For this type of service, the tubes 12 are also preferably formed of the same metal as the cladding plate 17 for the same reason.

The end portion 20 of the tube 12 and the bore 11 are so formed that an annular clearance space 21 is provided for an axial depth at least, but preferably greater than the thickness of the cladding plate 17. This clearance space 21 may be provided by a counterbore 22. The tube 12 is preliminarily positioned, as indicated at the left in FIG. 1, so that the end portion 20 extends to a moderate degree above the surface 19 of the cladding plate, for optimum welding of the tube to the wall of the bore 22 defining the clearance space 21 by the explosion welding device 14.

The explosion welding device 14 comprises a body member 24 having a longitudinal central axis and a cylindrical portion 25 and an enlarged tubular portion 26 of greater cross sectional area than the cylindrical portion 25 and coaxial therewith.

The cylindrical portion 25 has a diameter slightly smaller than the inside diameter of the tube 11 so that it is slidably engageable therewith, while the enlarged body portion 26 is of greater transverse dimension than the diameter of the bore 22 and of any suitable cross sectional shape such as circular or polygonal. The body portion 26 is provided with an annular recess or groove 27 defining the inner periphery of an axially extending skirt portion 28 and coaxially aligned with the cylindrical portion 25. The groove 27 has a minor diameter coincident with the diameter of the cylindrical portion 25 and a major diameter at least equal to or greater than the diameter of the counterbore 22. The skirt portion 28 has an end face 31 disposed in a plane normal to the longitudinal axis of the body 24.

The body portion 26 is provided with a central axially extending open-ended cavity 29 of circular cross-section having a bottom wall 30 lying in substantially the same plane as the end face 31 of the skirt 28.

Within the cavity 29 and in interfacial abutment with the bottom wall 30 thereof is an explosive charge 32 of any suitable discrete shape, such as disc or wafer-shape. The charge 32 is of about the same diameter as that of the cavity 29 and is thus maintained in a coaxial position with respect to the cylindrical body portion 25.

The charge 32 may comprise any suitable explosive material of sufficient detonation velocity to effect explosion welding, for example PETN mixed with a suitable binder material, as well known in the art.

The charge 32 is retained in the cavity 29 by a tubular sleeve 34 press fitted to the cavity 29 or otherwise firmly held therein. The sleeve 34 is provided with a central axially extending bore 35 having an internal cross-sectional area sufficient to receive a suitable detonation initiation device 36. The detonation device 36 may be of a type that is electrically fired and accordingly is provided with the usual pair of electrical conducting lead wires 37.

In operation, after the tube 12 is inserted in the bore 11, as illustrated on the left in FIG. 1, the explosive device 14 is fitted to the tube 12 by slidably inserting the cylindrical body portion 25 into the tube to the maximum extent permitted by the skirt portion 28, at which time the end face 31 of the skirt portion abuttably engages the face 19 of the cladding plate and further insertion is arrested.

Since the base 40 of the charge is in abutment with the bottom wall 30 of the cylindrical body portion 25, and since the bottom wall 30 is in the same plane as the end face 31 of the skirt portion, the charge 32 is thus inherently positioned with its base 40 in the plane of the surface 19 of the cladding plate.

Also, the groove 27 is of predetermined axial height and has an annular end face 42 that is brought to bear against the end portion 20 of the tube 12, during such insertion of the explosive device 14, and is effective to axially position the tube 12 in the bore 11 to a predetermined degree. In other words, the degre of protrusion of the tube end 20 above the plate surface 19 is inherently controlled by the axial height of the groove 27.

After the device 14 is thus fitted to the tube 12, the detonation initiator 36 is fired to detonate the explosive charge 32 and effect welding of the tube 12 to the wall of the bore 22, as indicated by the heavy lines 44 in conjunction with the tube 12 at the right in FIG. 1, and shear away the protruding end portion 20 of the thus welded tube 12 at the plate surface 19, as more fully shown and described in the previously mentioned Simons and Carlson patent application 467,244.

The body 24 and the sleeve 34 are formed of any suitable plastic material that is effective to couple or transmit the explosive energy of the charge 32 to the tube 12. Suitable materials are as follows: paraffin, polypropylene, polyethylene, nylon, and polyurethane rubber.

Upon detonation of the charge 32, the body 24 and the sleeve 34 of the explosive device 14, substantially disintegrate and the fragments are readily removable from the site.

The body 24 and the sleeve 34 may be separately formed by molding, machining or other suitable methods and assembled with the charge 32 to complete the device 14. Alternatively, the entire explosive device 14 may be molded in one piece with the explosive charge 32 imbedded therein.

Although, in the example shown, the charge 32 is positioned with its base 40 in the same plane as the end face 31 of the skirt, this position may be varied as desired. For example, if it is desired to position the charge 32 with its base 40 above or below the surface 19 of the cladding plate, the charge 32 is respectively prepositioned in the explosive device 14 with its base 40 in a parallel plane above or below the plane of the end face 31 to the required degree.

It will now be seen that the invention provides an explosive device 14 that can be manufactured as a unit by conventional mass production techniques and yet insure accurately predetermined placement of the explosive charge 32 with respect to a tube and plate to be subsequently explosion welded, and accurate axial positioning of the protruding end portion of the tube, to provide optimum welding and concomitant shearing of the protruding tube portion.

While the invention has been shown in one form, it will be obvious to those skilled in the art that it is not so limited, but is susceptible of various other changes and modifications without departing from the spirit thereof.

We claim as our invention:

1. An explosive device for explosively welding together an open-ended metal tube to a planar metal member disposed in encompassing relation therewith, comprising a body member having a longitudinal axis and having a first portion of cylindrical shape adapted to be inserted in said tube and a second portion of larger cross-sectional area than said first portion and coaxial therewith and adapted to abut said planar member, said second portion having an annular recess concentric with said cylindrical portion adapted to receive the end of said tube and defining the inner periphery of a skirt portion, and an explosive charge effective to weld the tube to said planar member and disposed in said body member, said second portion having an axially extending open-ended bore communicating with said charge.

2. The device recited in claim 1, wherein the skirt portion has an annular end face disposed in a plane transverse to the axis of the body and adapted to abut the planar member, and the explosive charge is disposed in juxtaposed relation with said plane.

3. The device recited in claim 1, wherein the skirt portion has an annular end face disposed in a plane normal to the axis of the body and adapted to abut the planar member, and the explosive charge is of solid discrete shape and is disposed in juxtaposed relation with said plane.

4. An explosive device for explosively welding an external peripheral portion of an open-ended metal tube to an annular surface defining a bore in a planar metal member, comprising an integral body having a cylindrical portion adapted to be inserted in said tube and a tubular portion having a common central axis, said tubular portion having an annular recess concentric with said cylindrical portion adapted to receive the open end of said tube and defining the inner periphery of an annular skirt portion of less axial length than said cylindrical portion, said tubular portion having a central axially extending cavity, an explosive charge disposed in said cavity, and a tubular sleeve disposed in mating relation with said cavity and retaining said charge therein.

5. The device recited in claim 4, wherein the skirt portion has an annular end face disposed in a plane transverse to the central axis and adapted to abut the planar member, and the explosive charge is disposed in juxtaposed relation with said plane.

6. The device recited in claim 4, wherein the skirt portion has an annular end face disposed in a plane normal to the axis of the body and adapted to abut the planar member, and the explosive charge is of solid discrete disc shape and is disposed in predetermined juxtaposed parallel relation with said plane.

References Cited

UNITED STATES PATENTS

| | | | |
|---|---|---|---|
| 3,036,373 | 5/1962 | Drexelius | 29—421 |
| 3,036,374 | 5/1962 | Williams | 29—421 |
| 3,045,339 | 7/1962 | Callahan | 29—421 |
| 3,127,923 | 4/1964 | Cadwell | 29—421 |

RICHARD H. EANES, Jr., *Primary Examiner.*